US009789823B2

(12) United States Patent
Salter et al.

(10) Patent No.: US 9,789,823 B2
(45) Date of Patent: Oct. 17, 2017

(54) ILLUMINATED TIERED CARGO AREA STORAGE FOR VEHICLE

(71) Applicant: FORD GLOBAL TECHNOLOGIES, LLC, Dearborn, MI (US)

(72) Inventors: Stuart C. Salter, White Lake, MI (US); Annette Lynn Huebner, White Lake, MI (US); Cornel Lewis Gardner, Romulus, MI (US); Pietro Buttolo, Dearborn Heights, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 119 days.

(21) Appl. No.: 14/931,359

(22) Filed: Nov. 3, 2015

(65) Prior Publication Data

US 2017/0120811 A1   May 4, 2017

(51) Int. Cl.
| | | |
|---|---|---|
| *B60Q 3/06* | (2006.01) | |
| *B60R 7/02* | (2006.01) | |
| *B60C 3/06* | (2006.01) | |
| *F21V 9/10* | (2006.01) | |
| *F21V 23/00* | (2015.01) | |
| *B60R 11/00* | (2006.01) | |
| *F21W 101/08* | (2006.01) | |

(52) U.S. Cl.
CPC ............... *B60R 7/02* (2013.01); *B60C 3/06* (2013.01); *F21V 9/10* (2013.01); *F21V 23/003* (2013.01); *B60R 2011/0036* (2013.01); *B60R 2011/0094* (2013.01); *F21W 2101/08* (2013.01)

(58) Field of Classification Search
CPC ... B60Q 3/06; B60Q 3/00; B60Q 3/30; B60Q 3/50; B60Q 3/74; B60R 7/02; B60R 2011/0036; B60R 2011/0094; F21V 9/10; F21V 23/003; F21V 9/00; F21W 2101/08
See application file for complete search history.

(56) References Cited

U.S. PATENT DOCUMENTS

| 6,210,013 | B1 | 4/2001 | Bousfield |
| 6,733,060 | B1 * | 5/2004 | Pavkov ................... B60R 5/04 |
| | | | 108/110 |
| 7,385,359 | B2 | 6/2008 | Dowling et al. |
| 7,806,543 | B2 | 10/2010 | Swofford et al. |
| 8,135,482 | B2 | 3/2012 | Caldwell et al. |
| 8,324,640 | B2 | 12/2012 | Jacob et al. |
| 8,562,058 | B1 | 10/2013 | Kim |

(Continued)

*Primary Examiner* — Bao Q Truong
(74) *Attorney, Agent, or Firm* — Vichit Chea; King & Schickli PLLC (57) ABSTRACT

A storage system for a vehicle cargo area includes at least one floor-mounted storage compartment including an interior photoluminescent material that luminesces in response to a light emitted by an overlying light source. The system further includes at least one cooperating deployable shelf or bin carrying the overlying light source and configured to deploy from the at least one storage compartment. At least one other deployable shelf or bin may be included carrying a light source. The light sources may be disposed behind a front edge of the at least one cooperating deployable shelf or bin and/or the at least one other deployable shelf or bin to emit light above and below the deployable shelfs or bins. A controller is provided to control an intensity and/or a color of light emitted by the light sources according to one or more inputs.

19 Claims, 6 Drawing Sheets

(56) References Cited

U.S. PATENT DOCUMENTS

| | | | |
|---|---|---|---|
| 8,651,351 B2* | 2/2014 | Fowler | B60R 5/04 |
| | | | 224/281 |
| 8,814,245 B1* | 8/2014 | Welch | B60R 5/04 |
| | | | 296/37.16 |
| 8,944,621 B2 | 2/2015 | Driver et al. | |
| 9,238,438 B1* | 1/2016 | Valencia Cruz | B60R 5/045 |
| 9,440,590 B1* | 9/2016 | Huelke | B60N 3/00 |
| 9,493,113 B2* | 11/2016 | Salter | B60Q 3/06 |
| 2008/0191626 A1 | 8/2008 | Salter et al. | |
| 2015/0023000 A1 | 1/2015 | Kendall et al. | |
| 2015/0138789 A1 | 5/2015 | Singer et al. | |
| 2015/0138806 A1* | 5/2015 | Salter | B60Q 3/06 |
| | | | 362/510 |
| 2015/0226403 A1 | 8/2015 | Dellock et al. | |

* cited by examiner

FIG. 6

ILLUMINATED TIERED CARGO AREA STORAGE FOR VEHICLE

TECHNICAL FIELD

This disclosure relates generally to storage for motor vehicles. More particularly, the disclosure relates to an illuminated tiered cargo area storage compartment/shelving system for a vehicle cargo area.

BACKGROUND

Storage systems such as deployable shelving, closable bins/compartments, and the like are often provided for vehicle cargo areas. For example, a cargo area of a vehicle having a rear liftgate closure, such as a sport-utility vehicle (SUV), a cross-over utility vehicle (CUV), and the like will include such hidden or deployable storage shelves/compartments. Often, particularly in conditions of low ambient light, the vehicle interior lighting is insufficient to allow the user to easily access and/or visualize the contents of such storage. It is also a goal of the vehicle manufacturer to provide lighting options which are unique and attractive to attract the attention of viewers.

Accordingly, the present disclosure relates to an illuminated tiered storage system for a motor vehicle cargo area. Advantageously, the described illuminated tiered storage system incorporates an illumination system comprising both task and accent lighting.

SUMMARY

In accordance with the purposes and benefits described herein, in one aspect a storage system for a vehicle cargo area is described, comprising at least one floor-mounted storage compartment including an interior photoluminescent material that luminesces in response to a light emitted by an overlying light source. The photoluminescent material may be a phosphor dye. The system may further include at least one cooperating deployable shelf or bin carrying the overlying light source and configured to deploy from the at least one storage compartment. The overlying light source is disposed to emit light above and below the at least one cooperating deployable shelf or bin. At least one other deployable shelf or bin may be disposed above the at least one cooperating deployable shelf or bin, the at least one other deployable shelf or bin carrying another light source configured to emit light above and below the at least one other deployable shelf or bin. In embodiments, the light source and the another light source may be disposed respectively behind a front edge of the at least one cooperating deployable shelf or bin and/or the at least one other deployable shelf or bin whereby when actuated, light is emitted above and below the deployable shelves or bins.

At least one controller is configured to control an intensity and/or a color of light emitted by the light source and/or the another light source according to various inputs. In embodiments, the inputs may be one or more of a vehicle day/night sensor signal, a vehicle closure panel ajar switch signal, a signal received from one or more switches associated with the at least one deployable shelf or bin and/or the at least one other deployable shelf or bin, a stored color value for the at least one deployable shelf or bin and/or the at least one other deployable shelf or bin and/or the at least one storage compartment, a stored color value of light emitted by the light source and/or the another light source, and a remote device wireless signal.

In other embodiments, the at least one cooperating deployable shelf or bin front edge and/or the at least one other deployable shelf or bin front edge include a dead-fronted portion comprising a material that is substantially opaque in an ambient light but substantially transparent or translucent when backlit. In still other embodiments, a top surface of the at least one cooperating deployable shelf or bin and/or the at least one other deployable shelf or bin includes a third light source disposed below a semi-transparent material.

In the following description, there are shown and described embodiments of the disclosed illuminated tiered storage system for a motor vehicle. As it should be realized, the system is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed illuminated tiered storage system for a motor vehicle, and together with the description serve to explain certain principles thereof. In the drawing.

Reference will now be made in detail to embodiments of the disclosed illuminated tiered storage system for a motor vehicle, examples of which are illustrated in the accompanying drawing figures.

DETAILED DESCRIPTION

Figure 1:
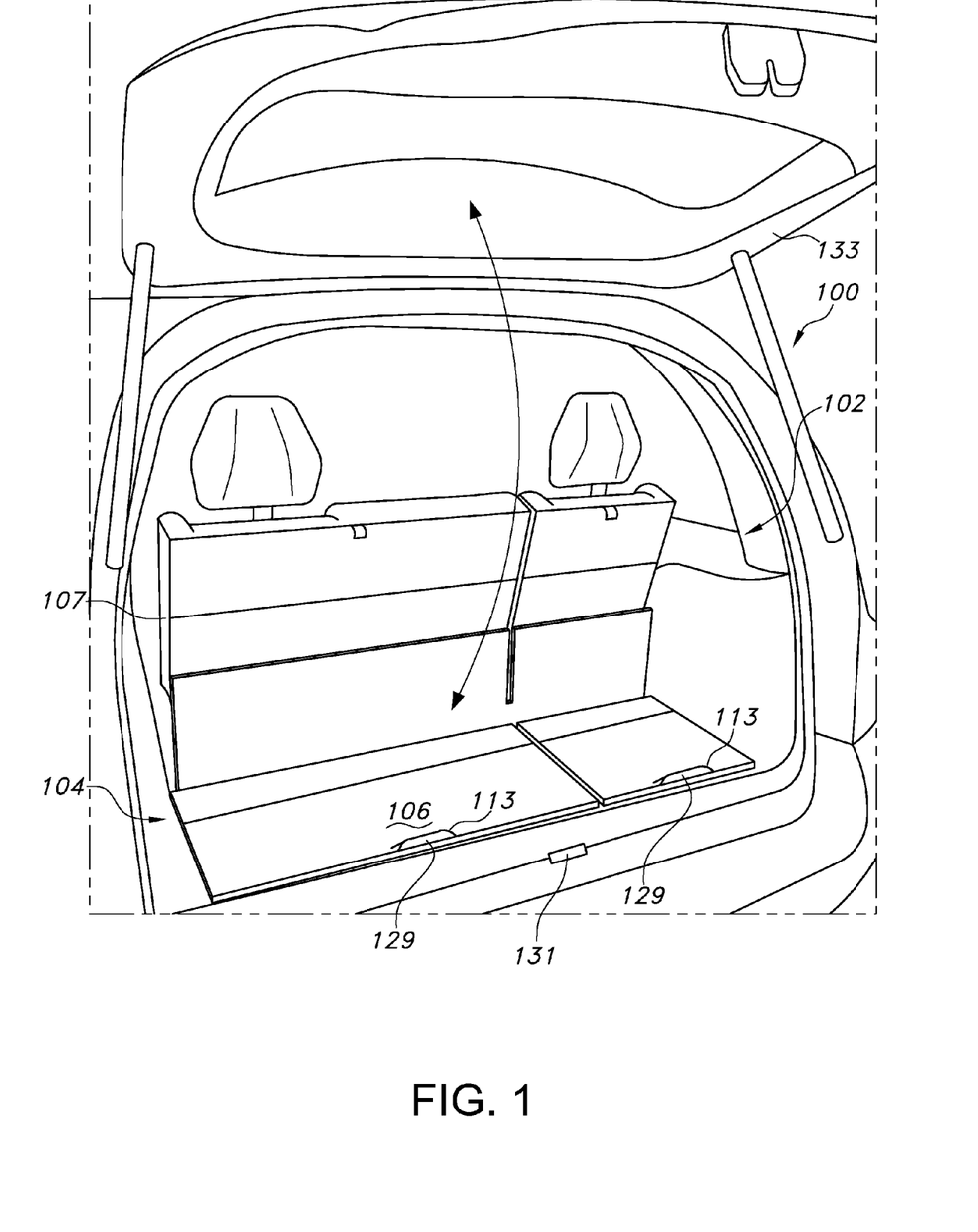
FIG. 1 depicts an illuminated tiered storage system for a motor vehicle according to the present disclosure in a stowed configuration.

With reference to FIG. 1, there is shown a vehicle 100 including a rear cargo area 102. Disposed within the cargo area 102 is an illuminated tiered storage system 104 according to the present disclosure, depicted in a fully stowed configuration to provide a cargo area floor surface 106 positioned behind a vehicle rear-most seatback 107. Seatback 107 may be a single seatback or may be a split seatback as depicted.

Figure 2A:
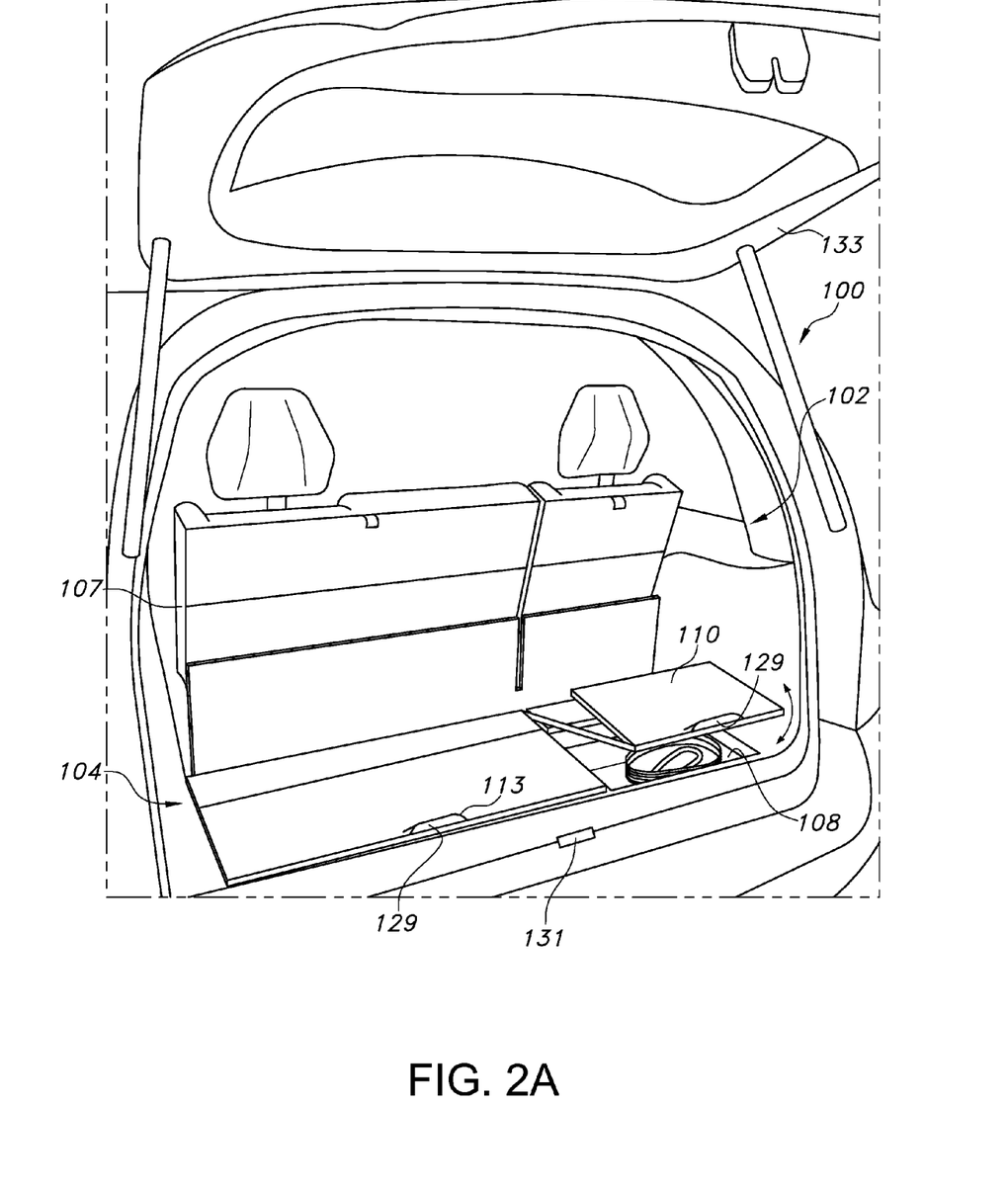
FIG. 2A depicts a second tier of the illuminated tiered storage system of FIG. 1 in a partially deployed stowed configuration.
Figure 2B:
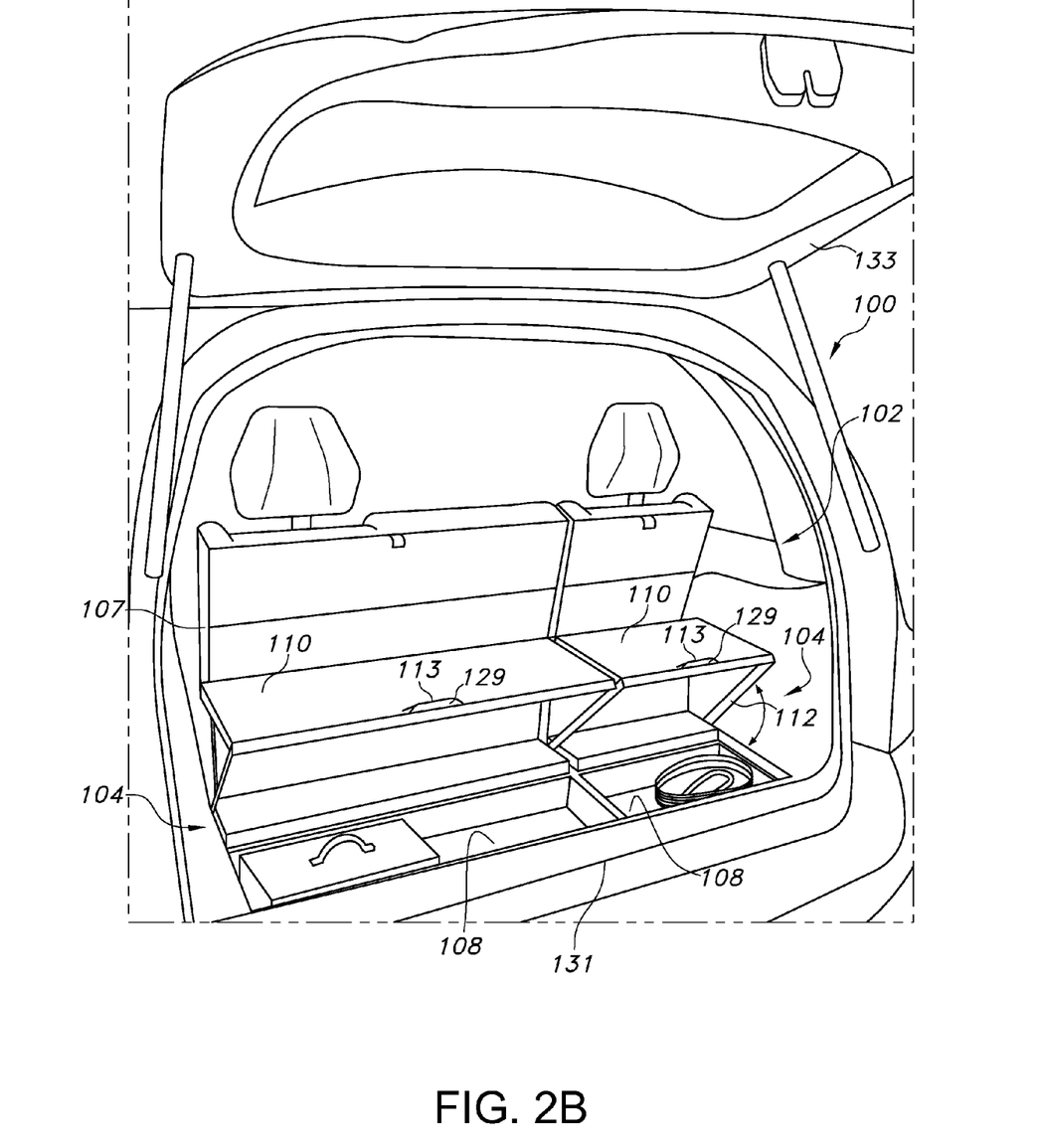
FIG. 2B depicts the second tier of FIG. 1 in a fully deployed stowed configuration.

As shown in FIG. 2A, a first element of the illuminated tiered storage system 104 is at least one floor-mounted storage compartment 108 including a lid or cover provided by a deployable shelf or bin 110, in the depicted embodiment being deployed by way of one or more pivoting struts 112 (see FIG. 2B). By way of pivoting struts 112 or other hinged mechanisms, deployable shelf or bin 110 is configured to translate between a stowed and a deployed configuration (see arrow). Deployment may be accomplished manually by a handle 113 or by way of a motorized system, and such mechanisms being well known in the art do not require extensive discussion herein. As shown in the drawing figure, the floor-mounted storage compartment 108/deployable shelf or bin 110 may be dimensioned to match the width dimensions of a split vehicle seatback 107, although of course other configurations are possible and contemplated.

Figure 3:
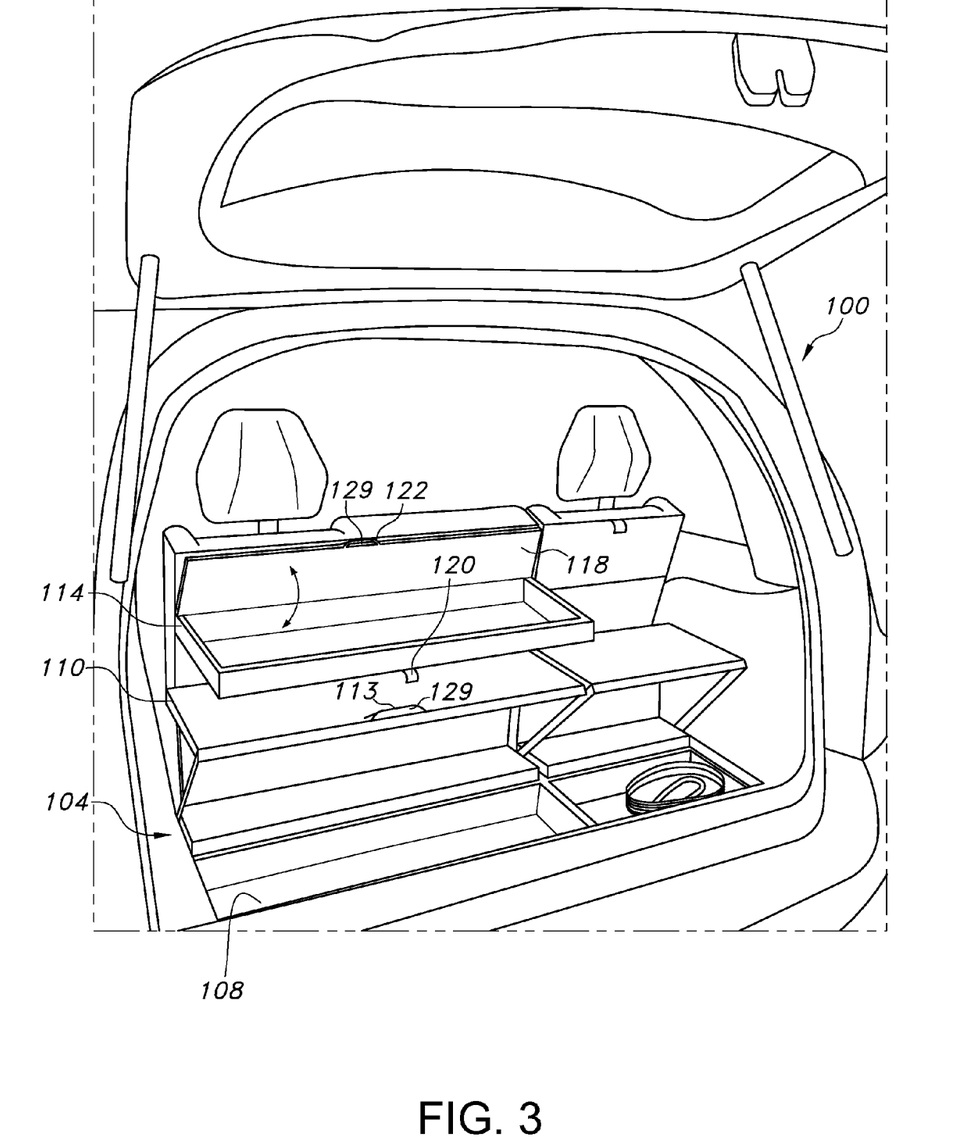
FIG. 3 depicts a third tier of the illuminated tiered storage system of FIG. 1 in a fully deployed stowed configuration.

With reference to FIG. 3, the illuminated tiered storage system 104 further includes at least one other deployable shelf or bin 114 disposed in a tiered or stacked configuration above the at least one floor-mounted storage compartment 108/deployable shelf or bin 110. The shelf or bin 114 may include a hinged cover 116 configured for translating between an open and a closed configuration (see arrow). As shown, the at least one other deployable shelf or bin 114 is deployed by pulling on a handle 118, although again motorized deployment mechanisms are known and are contemplated for inclusion. The hinged cover 116 may include a latching or locking mechanism/release 122 for securing the cover in a closed configuration. Again, the at least one other deployable shelf or bin 114/hinged cover 116 may be dimensioned to match the width dimensions of a split vehicle seatback 107, although of course other configurations are possible and contemplated.

Figure 4:
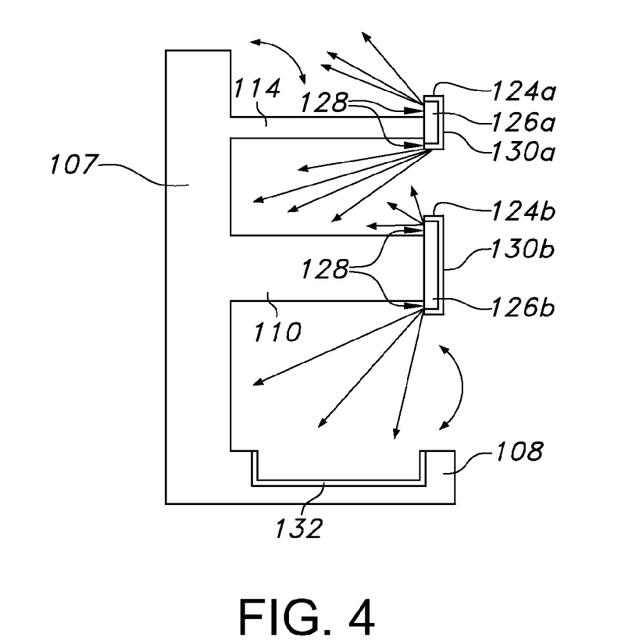
FIG. 4 is a side view of the illuminated tiered storage system in a fully deployed stowed configuration.

Still more, the illuminated tiered storage system 104 includes an innovative illumination system which will now be described. As shown in FIG. 4, the at least one deployable shelf or bin 110 and the at least one other deployable shelf or bin 114 each include a front edge 124a, 124b comprising a light source 126a, 126b. As depicted, each front edge 124 extends above and below a top and bottom surface of the at least one deployable shelf or bin 110 and the at least one other deployable shelf or bin 114. Each front edge 124 further includes light-emitting apertures 128 disposed and configured whereby light emitted from the light sources 126a, 126b is emitted respectively above and below the top and bottom surfaces of the at least one deployable shelf or bin 110 and the at least one other deployable shelf or bin 114 (see arrows).

Thus, when light sources 126a, 126b are actuated, illumination is provided to a top surface of the at least one deployable shelf or bin 110 and to a top surface of the at least one other deployable shelf or bin 114. As will be appreciated, this is possible even when the at least one deployable shelf or bin 110 is in a stowed configuration. As an additional advantage, front edges 124a, 124b serve to prevent items placed on a top surface of a deployed the at least one deployable shelf or bin 110 or at least one other deployable shelf or bin 114 from falling off of the shelf or bin.

In one embodiment, light sources 126a, 126b comprise a light pipe of known configuration for evenly transmitting and emitting light originating from one or more remotely positioned low-heat lamps such as light-emitting diodes (LEDs). Alternatively, light sources 126a, 126b may comprise one or more LED strings, fiber optics, etc. disposed within front edges 124a, 124b. In an embodiment, electrical power is routed to light sources 126a, 126b such that the light sources may be actuated regardless of whether the at least one deployable shelf or bin 110 and/or the at least one other deployable shelf or bin 114 are deployed or not. This may be accomplished by a number of methods, including by providing a suitable flex circuit such as associated with pivoting struts 112 or with a hinge structure of hinged cover 116. Such flex circuits are well known in the art.

In embodiments, light sources 126a, 126b may be LEDs configured to emit different colors. This may be accomplished by a variety of known mechanisms, including providing clusters of red, green, and blue (RGB) LEDs operatively connected to a controller which determines which color or colors of LED actuates to emit light of a desired color. Alternatively, it is also known to provide single color LEDs, for example blue, overlaid by a filtering layer with up-converts or down-converts the emitted light wavelength to in turn alter the color of light emitted. The filtering layer may be one or more photoluminescent layers which alter a wavelength of emitted light to a different color. The filtering layer may include one or more phosphor dyes as described in greater detail below. A more complete discussion of this process may be found in the present Assignee's U.S. Published Patent Appl. No. 2015/0138789 to Singer et al., published on May 21, 2015 and incorporated herein in its entirety by reference. As yet another alternative embodiment, the light sources 126a, 126b may simply be disposed behind a sheet of colored glass, plastic, or polymer to emit a desired light color.

Dedicated actuators 129 may be provided for light sources 126a, 126b, for example associated with handles provided to manually deploy the at least one deployable shelf or bin 110 and the at least one other deployable shelf or bin 114. Alternatively, one or more switches 129 may be provided, disposed remotely to the at least one deployable shelf or bin 110 and the at least one other deployable shelf or bin 114 (embodiment not shown in this view). A number of suitable actuators are known, including conventional, infrared, capacitive, and other switches, and all are contemplated for inclusion herein. As is known, the actuators 129 may be configured to control one or more of actuation of light sources 126a, 126b, intensity of light emitted by light sources 126a, 126b, and/or color of light emitted by light sources 126a, 126b (in the example of light sources 126a, 126b provided RGB LED clusters, pressing the actuator once actuates the blue LED, a second press actuates the green LED, etc., a third press actuates red, a fourth press turns the LEDs off, etc.).

Likewise, it is contemplated to cause the light sources to actuate similarly to conventional methods of actuating vehicle interior lighting, i.e. by operatively connecting light sources 126a, 126b to one or more "door ajar" switches 131 whereby a detected "door ajar" signal will cause actuation of the light sources. In an embodiment (see FIG. 1), a door ajar switch 131 is associated with a liftgate 133 of the vehicle. Of course, alternative arrangements are possible and contemplated, including door ajar switches associated with driver and/or passenger doors (not shown), with a vehicle trunk in embodiments wherein the cargo area 102 is disposed in a vehicle trunk (not shown), and others.

Optionally, one or both of front edges 124a, 124b may include a "dead-fronted" surface 130a, 130b. As is known, a dead-front surface comprises a material that is substantially opaque in ambient light, but substantially translucent when backlit such as by a light source 126a, 126b. This may be accomplished by a number of known means, including by providing a partial vac metalized dead front, a semi-transparent milky-white dead front, and others. Such structures are well-known in the art. By this feature, light sources 126a, 126b not only illuminate the top and bottom surfaces of the at least one deployable shelf or bin 110/at least one other deployable shelf or bin 114 as described, but also provide an illuminated, elegant front edge 130a, 130b.

In an embodiment, the at least one floor-mounted storage compartment 108 includes a lining 132 comprising a photoluminescent material which photoluminesces when contacted by light emitted from light source 126b. This photoluminescence provides additional illumination and an elegant appearance to the interior of the storage compartment 108. A number of suitable photoluminescent materials are known in the art, including without intending any limitation phosphor dyes such as rylene phosphor, yttrium aluminum garnet (YAG) phosphor, and others, and all are contemplated for use herein. The lining 132 may be provided by any suitable expedient, such as coating at least a portion of an interior surface of the storage compartment 108 with a desired photoluminescent material, by providing a separate liner comprising the photoluminescent material, and others.

It is known in the art that many factors influence the manner in which emitted light is perceived, particularly in a closed environment such as a vehicle interior. For example, in ambient (daytime) light, vehicle interior lighting intensity must be increased to be perceived properly, whereas at night or other low light situations, a lesser intensity of vehicle interior light will be required. Likewise, a color of a vehicle interior will influence the perception of emitted light. For example, a dark-colored interior will reflect less light because a dark surface absorbs more light, and so vehicle interior lighting intensity must be increased to provide a desired level of illumination. On the other hand, a light-colored interior will reflect more light, and so a lesser intensity of vehicle interior light will be needed. Still more, different colors of light are perceived differently by the human eye. For example, the human eye is less sensitive to the color blue, and so a green light emitted at a particular intensity will appear bright to the human eye, whereas a blue light emitted at the identical intensity will appear dim. Therefore, an increased intensity of blue light may be required to be properly perceived by the human eye.

Therefore, to provide emitted light for the described illuminated tiered storage system 104 that provides a consistent, attractive level of illumination as perceived by a viewer, a multi-factorial control system relying on a variety of inputs is implemented for the illuminated tiered storage system 104 and light sources 126a, 126b to accommodate these needed variations in lighting color/intensity.

Figure 5:
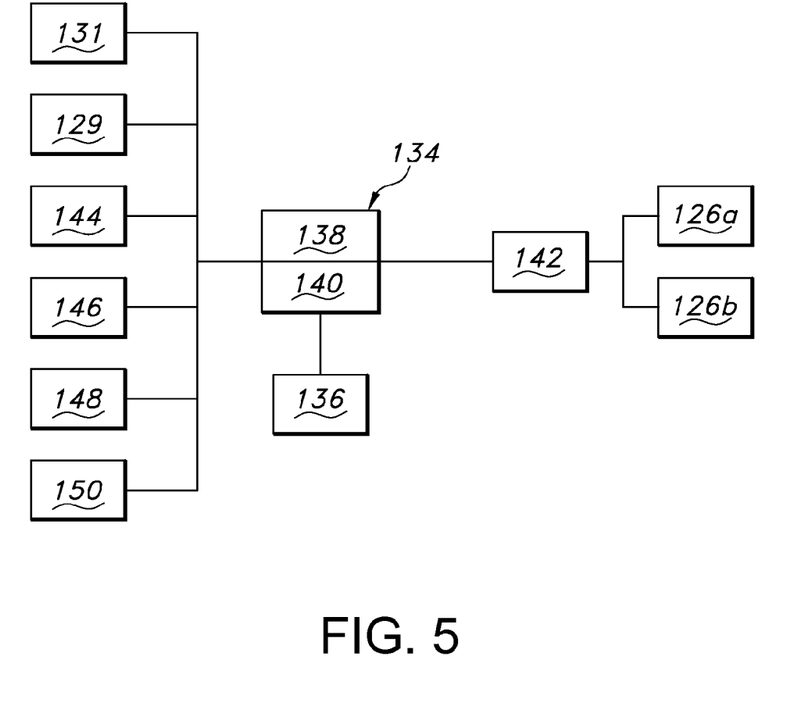
FIG. 5 is a block diagram of a control scheme for the illuminated tiered storage system.

With reference to FIG. 5, the light sources 126a, 126b may be electrically coupled to at least one controller 134 and an on-board vehicle power source 136 such as a battery. As is known, the controller 134 may include at least one processor 138 operable to execute computer-readable instructions, and at least one memory 140, which may be any suitable memory, e.g. RAM, ROM, EEPROM, and others. The controller 134 may be the vehicle basic control module (BCM), or may comprise one or more additional controllers in operative connection thereto. A module 142 operationally linked to the controller 134 may be included for altering a voltage supplied to light sources 126a, 126b and therefore an intensity of light emitted from the light sources. In one embodiment, the module 142 is a pulse-width modulator (PWM) of substantially known design. Certain inputs which may affect a desired color and/or intensity of light emitted from light sources 126a, 126b have been described above, such as signals received from actuators 129 and door ajar switches 131. Likewise, a signal from a day/night sensor 144 may affect required lighting intensity from light sources 126a, 126b as described above.

In turn, a vehicle interior color 144 and a light source 126a, 126b color may be stored in memory 140. As described above, different colors of light are perceived differently by the human eye, and still more are perceived differently when emitted against a light versus a dark color. Typically, vehicles are manufactured in particular color packages, that is, specific combinations of interior and exterior color schemes. In turn, a color emitted by light sources 126a, 126b may be predetermined as part of a specific vehicle color package, or may be custom-ordered by a consumer. Thus, for example, the color or colors of the components of the vehicle cargo area 102 are known in advance, and may be stored as interior color values 146 and/or light source color values 148 in memory 140. The controller processor 136 can then access those stored color values, such as by a look-up table, and by way of module 142 allow sufficient voltage from power source 136 to reach light sources 126a, 126b to cause emission of light from the light sources at a desired intensity according to the stored color values for the vehicle interior and/or light sources.

Alternative inputs are also contemplated. For example, when a vehicle 100 liftgate is ajar and so vehicle interior lighting is actuated while the vehicle engine is not running, it is known to include a controller 134 configured to dim the lighting after a pre-determined time period to conserve battery power. A similar control schema is contemplated for light sources 126a, 126b. As another feature, a wireless signal 150 from a vehicle user-carried remote device, for example a vehicle owner's cellular telephone, smartphone, key fob, smart key, etc. may re-actuate the light sources 126a, 126b when within a predetermined distance from a rear of the vehicle 100, for example 20-30 feet. Any suitable wireless signal type is contemplated, including without intending any limitation a Bluetooth® signal.

Figure 6:
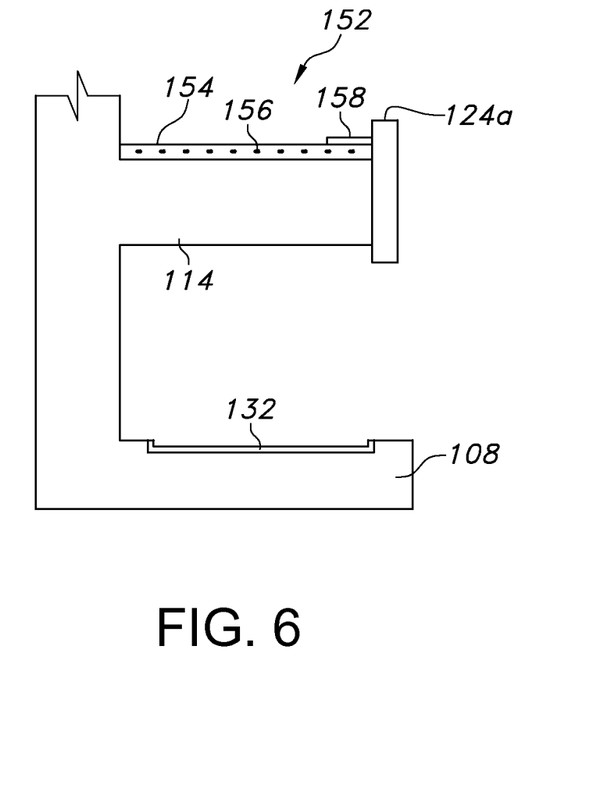
FIG. 6 illustrates an alternative embodiment of the third tier of FIG. 3.

Obvious modifications and variations are possible in light of the above teachings. For example, in addition to the above-described illumination schema, a top surface 152 of each of one or both of the at least one deployable shelf or bin 110 and the at least one other deployable shelf or bin 114 could comprise a semi-transparent material 154 overlaid over one or more light sources such as LEDs 156 to create an attractive, glowing top surface to the shelf or bin (see FIG. 6). In one non-limiting example, printed LED technology is readily adaptable to this embodiment. In addition, a photoluminescent material 158 as described above could be applied to a portion of one or both of the at least one deployable shelf or bin 110 and the at least one other deployable shelf or bin 114, for example to mark a front edge 124a, 124b for improved visibility in low lighting conditions.

Also, the disclosed illuminated tiered storage system is described herein primarily in an embodiment associated with a rear-most seat seatback 107 of a vehicle 100 such as an SUV, a CUV, and the like including a rear cargo area having a closure panel such as a rear liftgate. However, it will be appreciated that the system is readily integrated into any motor vehicle cargo area having a floor and at least one wall, for example a motor vehicle trunk, and so the disclosure should not be taken as limiting in this respect. All such modifications and variations are within the scope of the appended claims when interpreted in accordance with the breadth to which they are fairly, legally and equitably entitled.

What is claimed:

1. A storage system for a vehicle cargo area, comprising at least one floor-mounted storage compartment including an interior photoluminescent material that luminesces in response to a light emitted by an overlying light source carried by at least one cooperating deployable shelf or bin.

2. The system of claim 1, wherein the at least one cooperating deployable shelf or bin carrying the overlying light source is configured to deploy from the at least one storage compartment; and further wherein the overlying light source is disposed to emit light above and below the at least one cooperating deployable shelf or bin.

3. The system of claim 2, further including at least one other deployable shelf or bin disposed above the at least one cooperating deployable shelf or bin, the at least one other deployable shelf or bin carrying another light source configured to emit light above and below the at least one other deployable shelf or bin.

4. The system of claim 3, wherein the overlying light source and the another light source are disposed respectively behind a front edge of the at least one cooperating deployable shelf or bin and/or the at least one other deployable shelf or bin.

5. The system of claim 3, further including at least one controller configured to control an intensity and/or a color of light emitted by the overlying light source and/or the another light source according to one or more inputs.

6. The system of claim 5, wherein the one or more inputs are selected from the group consisting of a vehicle day/night sensor signal, a vehicle closure panel ajar switch signal, a signal received from one or more switches associated with the at least one deployable shelf or bin and/or the at least one other deployable shelf or bin, a stored color value for the at least one deployable shelf or bin and/or the at least one other deployable shelf or bin and/or the at least one storage compartment, a stored color value of light emitted by the overlying light source and/or the another light source, and a remote device wireless signal.

7. The system of claim 4, wherein the at least one cooperating deployable shelf or bin front edge and/or the at least one other deployable shelf or bin front edge include a dead-fronted portion comprising a material that is substantially opaque in an ambient light but substantially transparent or translucent when backlit.

8. The system of claim 3, wherein a top surface of the at least one cooperating deployable shelf or bin and/or the at least one other deployable shelf or bin comprises a third light source disposed below a semi-transparent material.

9. The system of claim 1, wherein the photoluminescent material is a phosphor dye.

10. A motor vehicle including the system of claim 1.

11. A storage system for a vehicle cargo area, comprising at least one floor-mounted storage compartment including an interior photoluminescent material that luminesces in response to a light emitted by an overlying light source; and at least one cooperating deployable shelf or bin carrying the overlying light source and configured to deploy from the at least one storage compartment;
wherein the overlying light source is disposed to emit light above and below the at least one cooperating deployable shelf or bin.

12. The system of claim 11, further including at least one other deployable shelf or bin disposed above the at least one cooperating deployable shelf or bin, the at least one other deployable shelf or bin carrying another light source configured to emit light above and below the at least one other deployable shelf or bin.

13. The system of claim 12, wherein the overlying light source and the another light source are disposed respectively behind a front edge of the at least one cooperating deployable shelf or bin and/or the at least one other deployable shelf or bin.

14. The system of claim 12, further including at least one controller configured to control an intensity and/or a color of light emitted by the overlying light source and/or the another light source according to one or more inputs.

15. The system of claim 14, wherein the one or more inputs are selected from the group consisting of a vehicle day/night sensor signal, a vehicle closure panel ajar switch signal, a signal received from one or more switches associated with the at least one deployable shelf or bin and/or the at least one other deployable shelf or bin, a stored color value for the at least one deployable shelf or bin and/or the at least one other deployable shelf or bin and/or the at least one storage compartment, a stored color value of light emitted by the overlying light source and/or the another light source, and a remote device wireless signal.

16. The system of claim 12, wherein the at least one cooperating deployable shelf or bin front edge and/or the at least one other deployable shelf or bin front edge include a dead-fronted portion comprising a material that is substantially opaque in an ambient light but substantially transparent or translucent when backlit.

17. The system of claim 12, wherein a top surface of the at least one cooperating deployable shelf or bin and/or the at least one other deployable shelf or bin comprises a third light source disposed below a semi-transparent material.

18. The system of claim 11, wherein the photoluminescent material is a phosphor dye.

19. A motor vehicle including the system of claim 11.

* * * * *